Patented Sept. 29, 1953

2,653,896

UNITED STATES PATENT OFFICE 2,653,896

INSECTICIDAL COMPOUNDS

Edward B. Hodge, Terre Haute, Ind., assignor to Commercial Solvents Corporation, Terre Haute, Ind., a corporation of Maryland No Drawing. Application February 10, 1951,
Serial No. 210,432

6 Claims. (Cl. 167—30)

My invention relates to insecticidal compositions and is particularly concerned with materials adapted for combating flies, the Mexican bean beetle, the southern army worm, and other common insect pests. More particularly, it relates to 2 - nitro - 1 - p-chlorophenyl-1-(2,4-dichlorophenyl) alkanes having the formula:

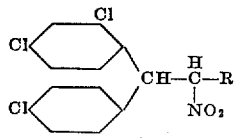

wherein R is an alkyl chain selected from the group $CH_3$ and $C_2H_5$, as active ingredients in such compositions.

Many materials and classes of materials have in the past been recommended as insecticides, fungicides, pesticides, and the like. A great majority of these, however, have been impractical for various reasons due to availability, cost, impractical physical characteristics such as odor, undesirable effects on the hosts or other objects with which the product comes in contact, difficulty and danger of application, etc. Of equal if not greater importance, is the high degree of selectivity possessed by many products of this character. For example, a particular agent may be especially effective against one or two insects but have no harmful action whatsoever on any other when applied in practical quantities. Also, particular insects incline to be resistant to almost every kind of insecticidal compound of practical utility known. Even closely related chemical compounds often have widely different effects upon both pests and their host, with the result that a new material must be tested under conditions simulating those of actual use before its utility can be determined.

The efficacy of an insecticidal composition is most generally measured in terms of per cent kill. It goes without saying that such measurements must be for a definite period of time, and that other conditions must be carefully controlled and standardized to permit comparisons of results. For flying insects, the efficacy may also be measured in terms of per cent knockdown. Many prior art insecticides possess kill and knock-down characteristics in different degrees. For this reason, it may be necessary to combine two or more compounds in order to achieve effectively both knock-down and kill. In general, an insecticide possessing both properties in a high degree has greater utility than another insecticide which is comparable in only one property.

I have now discovered that compounds having the general formula:

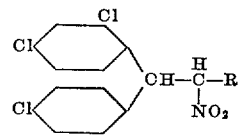

wherein R is an alkyl chain selected from the group $CH_3$ and $C_2H_5$, possess strong insecticidal properties; and, in particular, that these compounds are especially effective killing agents for the house fly, southern army worm, Mexican bean beetle and pea aphid. I have also discovered that not only do my new compounds produce a high per cent kill, when used in low concentrations against flies, but also that they possess excellent knock-down properties.

My invention comprises two compounds; namely, 2-nitro-1-p-chlorophenyl-1-(2,4-dichlorophenyl)propane and 2-nitro-1-p-chlorophenyl-1-(2,4-dichlorophenyl)-butane.

The 2 - nitro - 1-p-chlorophenyl-1-(2,4-dichlorophenyl)-propane of my invention can be prepared as follows: To a mixture of 163 g. of chlorobenzene and 326 g. of 96% sulfuric acid was added 163 g. of 2-nitro-1-(2,4-dichlorophenyl)-1-propanol. This addition took 45 minutes and the reaction mixture was stirred vigorously and cooled to 25° C. by a circulating water bath during the addition. After all the nitro alcohol had been added stirring was continued for an additional 15 minutes. Then the oil layer was separated and washed with 200 ml. of 5% sodium carbonate solution. Then 400 ml. of water were added and the mixture was distilled to a vapor temperature of 99° C. On standing, the oil residue from this distillation partially crystallized. It was mixed with 200 ml. of petroleum ether and the solid thus obtained was recrystallized from ethyl alcohol two times to give a product which melted at 103–106° C. The yield of 2-nitro-1-p-chlorophenyl-1-(2,4 - chlorophenyl)propane was 53%.

The 2-nitro-1-(2,4-dichlorophenyl)-1-propanol used in the above condensation was obtained by condensing 2,4-dichlorobenzaldehyde with nitroethane. A convenient method for effecting this condensation is as follows:

Four moles of 2,4-dichlorobenzaldehyde was added with stirring to a solution of 440 g. of sodium bisulfite with 2000 ml. of distilled water and stirred at room temperatures for two hours. Simultaneously six moles of nitroethane was dissolved slowly in a solution of 180 g. of sodium hydroxide in 800 ml. of water, which was cooled in an ice-salt bath.

These solutions were mixed and stirred at room temperature for twelve hours, then poured into a separatory funnel. The two layers were separated, the aqueous layer was extracted with ether, and the ether portion was added to the organic layer. The ether solution was extracted with saturated sodium bisulfite solution until unreacted aldehyde was removed. The ether solution was then dried with anhydrous sodium sulfate and the ether evaporated. Conversion to 2-nitro-1-(2,4-dichlorophenyl)-1-propanol was 92%.

The 2-nitro-1-p-chlorophenyl-1-(2,4-dichlorophenyl)-butane can be prepared by condensing 2-nitro-1-(2,4-dichlorophenyl)-1-butanol following the same procedure as that given above for condensing 2-nitro-1-(2,4-dichlorophenyl)-1-propanol with chlorobenzene. Also, the 2-nitro-1-(2,4-dichlorophenyl)-1-butanol may be prepared by condensation of 2,4-dichlorobenzaldehyde with 1-nitropropane, substantially as described above for the preparation of 2-nitro-1-(2,4-dichlorophenyl)-1-propanol.

The exact quantity of my new compound to be utilized in insecticidal compositions will be found to vary rather widely and to a certain extent depends upon the type of compositions in which the material is being employed, method of application, nature of the insect pest to be controlled, and other factors commonly encountered in the insecticidal art. Since the materials are relatively insoluble in some of the common solvents, this factor must also be taken into consideration. In general, however, compositions containing about 2% by weight, in either a liquid or solid carrier, give excellent results. For some requirements, stronger concentrations may be desirable up to a maximum of about 5% for rapid knock-down of flies.

In Tables I and II below are given the results of tests with my new compounds against various insect pests at different concentrations. Each entry in Tables I and II is an average of several replications. The testing procedure used for female house flies was substantially as follows:

Solutions of various concentrations were prepared by dissolving the active agent in a solvent as a carrier. Adult flies reared in the laboratories under controlled conditions were introduced into spherical cages. Each cage was then placed on a revolving turn-table, and the flies subjected to an atomized spray under constant pressure until 1.0 ml. was delivered per cage. Immediately after the flies in the cage were sprayed, they were transferred to an observation cage, in which they were maintained under constant conditions for 24 hours. At the end of that time the number of dead flies was counted.

For the Mexican bean beetle, and the southern army worm the following procedure was used: Different quantities of the active insecticidal agents were uniformly mixed with a solid inert carrier in the form of a finely ground powder. The dust thus obtained was applied in 0.2 gram amounts to host plants to which the insects were then transferred. The host plants utilized for these tests were cranberry beans. At the end of 48 hours the percentage of dead insects was determined.

TABLE I

2 - nitro - 1 - p - chlorophenyl-1-(2,4-dichlorophenyl) butane

| Insect | Percent Concentration of toxicant | Average Percent Kill |
|---|---|---|
| Flies | None | 1 |
| Do | 0.0125 (by volume) | 46 |
| Do | 0.05 (by volume) | 100 |
| Mexican Bean Beetle | None | 0 |
| Do | 0.125 (by weight) | 66 |
| Do | 0.25 (by weight) | 100 |
| Do | 0.50 (by weight) | 100 |
| Southern Army Worm | None | 6 |
| Do | 0.25 (by weight) | 93 |
| Do | 0.50 (by weight) | 100 |

TABLE II

2 - nitro - 1 - p - chlorophenyl-1-(2,4-dichlorophenyl) propane

| Insect | Percent Concentration of toxicant (by weight) | Average Percent Kill |
|---|---|---|
| Mexican Bean Beetle | 0.25 | 90 |
| Do | 0.50 | 86 |
| Southern Army Worm | 0.25 | 93 |
| Do | 0.50 | 93 |

The diluents used in insecticidal compositions, whether liquid or solid, are generally called carriers or vehicles. For my compounds, many different carriers may be used. Effective concentrations can be obtained with most common solvents for relatively long-chain nitroparaffin hydrocarbons. The upper limit of the possible concentration in these solvents, however, will be below 5% in many cases, because my compounds are relatively insoluble. Household spray kerosene (Ultrasene) was used as the carrier in the fly tests reported above. Effective concentrations can be used in other liquid carriers such as the lower aliphatic alcohols (methyl, ethyl, propyl, butyl), chlorinated hydrocarbons solvents (carbon tetrachloride, dichloromethane, trichloromethane) and aromatic hydrocarbons (benzene, xylene, toluene). Aqueous suspensions of 1% can be made and are unusally effective in some cases. Also, aqueous emulsions can be advantageously used.

As a solid vehicle I can employ any of the forms of powdered magnesium or aluminum silicates which are commonly employed in insecticidal compositions, such as pyrophyllite, bentonite, fuller's earth, kieselguhr, kaolin and talc. In the tests reported above, except for flies, pyrophyllite was employed as the carrier. When solid carriers are used, there is, of course, no limit to the obtainable concentrations.

In addition to either a liquid or solid carrier, other killing agents may be mixed with my compounds. Low solubilities may limit the use of certain additional agents in a liquid carrier; but, in general, my compounds may be used in conjunction with killing agents such as pyrethrum, rotenone, derris extract, nicotine, and organic thiocyanates.

Economically, my compounds possess the great advantage of remaining highly toxic in very low concentrations. Another advantage of my compounds, not mentioned elsewhere, is that they do not produce a discoloration of vegetables such as squash and cucumbers. Furthermore, my compounds are safe; and, when it comes to performance combined with safety, my compounds are a great improvement over similar prior art insecticides.

I claim:
1. Compounds of the general formula:

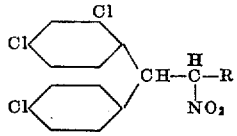

wherein R is an alkyl radical selected from the group $CH_3$ and $C_2H_5$.

2. 2 - nitro - 1 - p - chlorophenyl - 1 - (2,4 - dichlorophenyl)-propane.
3. 2 - nitro - 1 - p - chlorophenyl - 1 - (2,4-dichlorophenyl)-butane.
4. An insecticidal composition comprising from about 0.0125 to about 5.0% of a compound of the general formula:

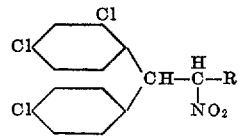

wherein R is an alkyl radical selected from the group $CH_3$ and $C_2H_5$, and a carrier therefor.

5. The composition of claim 4 where the carrier is a petroleum distillate.
6. The composition of claim 4 where the carrier is a powdered aluminum silicate.

EDWARD B. HODGE.

References Cited in the file of this patent
UNITED STATES PATENTS

| Number | Name | Date |
| --- | --- | --- |
| 2,397,802 | Muller | Apr. 2, 1946 |
| 2,516,186 | Haas et al. | July 25, 1950 |